US012591952B2

(12) United States Patent　　　　　(10) Patent No.:　US 12,591,952 B2
Sanchit et al.　　　　　　　　　　　(45) Date of Patent:　　Mar. 31, 2026

(54) IMAGE ROTATION

(71) Applicant: Canva Pty Ltd, Surry Hills (AU)

(72) Inventors: Sanchit Sanchit, Vienna (AT); Stefan Sietzen, Salzburg (AT)

(73) Assignee: CANVA PTY LTD, Surry Hills (AU)

( * ) Notice: Subject to any disclaimer, the term of this patent is extended or adjusted under 35 U.S.C. 154(b) by 0 days.

(21) Appl. No.: 18/939,826

(22) Filed: Nov. 7, 2024

(65) Prior Publication Data

US 2025/0069189 A1　　　Feb. 27, 2025

Related U.S. Application Data

(63) Continuation of application No. 18/601,971, filed on Mar. 11, 2024, now Pat. No. 12,482,063.

(30) Foreign Application Priority Data

Mar. 31, 2023　　(AU) ................................. 2023202005

(51) Int. Cl.
　　*G06T 3/60*　　　　　(2024.01)
　　*G06V 10/764*　　　 (2022.01)
(52) U.S. Cl.
　　CPC .............. *G06T 3/60* (2013.01); *G06V 10/764* (2022.01)
(58) Field of Classification Search
　　CPC ................................. G06T 3/60; G06V 10/764
　　See application file for complete search history.

(56) References Cited

U.S. PATENT DOCUMENTS

| | | | |
|---|---|---|---|
| 2003/0099395 A1 | 5/2003 | Wang et al. | |
| 2005/0105805 A1* | 5/2005 | Nicponski | G06V 10/757 |
| | | | 382/216 |
| 2015/0003672 A1 | 1/2015 | Sarkis et al. | |
| 2020/0252550 A1* | 8/2020 | Kim | G06T 7/74 |
| 2020/0342574 A1* | 10/2020 | Meinke | G06T 7/20 |
| 2021/0125036 A1 | 4/2021 | Tremblay et al. | |
| 2021/0150757 A1* | 5/2021 | Mustikovela | G06N 3/08 |
| 2021/0209425 A1* | 7/2021 | Nataraj | G06F 18/2415 |

(Continued)

FOREIGN PATENT DOCUMENTS

EP　　　　3093821 A1　　11/2016

OTHER PUBLICATIONS

Altamirano, L. et al., "Non-uniform sampling for improved appearance-based models," Pattern Recognition Letters, vol. 24, Issues 1-3, 2003, pp. 521-535, ISSN 0167-8655, https://doi.org/10.1016/S0167-8655(02)00274-X.

(Continued)

*Primary Examiner* — Oneal R Mistry
*Assistant Examiner* — Jongbong Nah
(74) *Attorney, Agent, or Firm* — GrowIP Law Group LLC

(57)　　　　　　ABSTRACT

Methods of training a machine learning model for image processing are described, as well as methods for image processing to determine a predicted rotation value for an image based on the trained machine learning model. A method of training includes utilising as a learning objective a reduction or minimisation of a classification loss. Training image pairs may be associated with classifications corresponding to rotation values for the purpose of determining the classification loss. An image may be divided into a plurality of images for determining an input to the machine learning model, for training or for image processing.

20 Claims, 7 Drawing Sheets

(56)        References Cited

U.S. PATENT DOCUMENTS

2021/0258512 A1      8/2021  Sandambata
2021/0407045 A1 *  12/2021  Mironica  ................. G06N 3/08

OTHER PUBLICATIONS

European Search Report for application No. EP24166532 mailed Jun. 12, 2024, pp. 1-11.
Examination Report No. 1 for Australian Application No. 2023202005 mailed May 15, 2023, pp. 1-6.
Examination Report No. 1 for Australian application No. 2023202429 mailed Jul. 24, 2023, pp. 1-6.
Examination Report No. 2 for Australian application No. 2023202429 mailed Apr. 5, 2024, pp. 1-4.
Fischer Philipp et al: "Image Orientation Estimation with Convolutional Networks", Oct. 7, 2015 (Oct. 7, 2015), SAT 2015 18th International Conference, Austin, TX, USA, Sep. 24-27, 2015; [Lecture Notes in Computer Science; Lect.Notes Computer], Springer, Berlin, Heidelberg, pp. 368-378.
Garg et al, A Simple Approach to Image Tilt Correction with Self-Attention MobileNet for Smartphones: https://www.bmvc2021-virtualconference.com/assets/papers/1364.pdf, pp. 1-12.
Gidaris et al, Unsupervided representation learning by predicting image rotations https://arxiv.org/pdf/1803.07728, pp. 1-16.
Khan, K., et al., "3D Head Pose Estimation through Facial Features and Deep Convolutional Neural Networks", Computers, Materials & Continua 2021 vol. 66 No. 2, published 2021 < URL: https://pdfs.semanticscholar.org/3a8a/5b656b3d28c791c6fc0df251c4df63f7381a.pdf >, pp. 1757-1770.
Maji, S. et al., "Deep image orientation angle detection", arXiv preprint arXiv:2007.06709, published Jun. 21, 2020 < URL: https://arxiv.org/pdf/2007.06709.pdf >, pp. 1-8.

Mikaeili, M. et al., "Estimating rotation angle and transformation matrix between consecutive ultrasound images using deep learning", 2020 Medical Technologies Congress (Tiptekno), IEEE, published 2020 < URL: http://biyoklinikder.org/TIPTEKNO20_Bildiriler/013.pdf>, pp. 1-4.
Mikolka-Flory, S. et al., "Horizon Line Detection in Historical Terrestrial Images in Mountainous Terrain Based on the Region Covariance", Remote Sensing 13.9 (2021): 1705, published Apr. 28, 2021 < URL: https://www.mdpi.com/2072-4292/13/9/1705/pdf?version=1619604774 >, pp. 1-18.
Mironica et al, A Fast Deep Learning Network for Automatic Image Auto-Straightening: https://arxiv.org/pdf/2105.05787, pp. 1-5.
Oleg Okun et al: "Document skew estimation without angle range restriction", International Journal of Document Analysis and Recognition (IJDAR), vol. 2, No. 2-3, Dec. 1, 1999, pp. 132-144.
Shahid, "Convolutional Neural Network—Learn Convolutional Neural Network from basic and its implementation in Keras", Towards Data Science, published Feb. 25, 2019 < URL: https://towardsdatascience.com/covolutional-neural-network-cb0883dd6529>, pp. 1-30.
Sietzen, S. et al., "Interactive analysis of CNN robustness", Computer Graphics Forum 2021, vol. 40, No. 7, pp. 253-264, published Oct. 14, 2021 < URL: https://arxiv.org/pdf/2110.07667.pdf>, pp. 1-13.
Yi, D. et al., "Deep Metric Learning for Practical Person Re-Identification", arXiv preprint arXiv:14074979, published Jul. 18, 2014 , pp. 1-11.
Yusuke Takahashi et al: "Relevant image pre-filtering in automatic image orientation correction", 2010 17th IEEE International Conference on Image Processing (ICIP 2010); Sep. 26-29, 2010; Hong Kong, China, IEEE, Piscataway, NJ, USA, Sep. 26, 2010, pp. 2657-2660.

* cited by examiner

100

200

301 — Receive or generate images representing target

302 — Select target image

303 — Randomly select a rotation value

304 — Form rotated image based on selected rotation value

305 — Associate target image, rotated image and rotation value

306 — End condition met?

N

Y

End

300

501 — Receive input image

502 — Correct image?

503 — Apply trained ML model to determine a class

504 — Correct image?

505 — Return (and apply) predicted angle

506 — Return 0 degrees as the predicted angle

500

Input image of portrait type

Rotate image randomly and extract
squared 3 crops

Resize them

Input squared 480x480
crops to model

IMAGE ROTATION

CROSS-REFERENCE TO RELATED APPLICATION

This application is a continuation of U.S. Non-Provisional application Ser. No. 18/601,971, filed on Mar. 11, 2024, that claims priority to Australian Patent Application No. 2023202005, filed Mar. 31, 2023, which are each hereby incorporated by reference in their entirety.

FIELD OF THE DISCLOSURE

The present disclosure relates to the field of image processing. Particular embodiments relate to a method of determining a rotation for a digital image, the determination made using a computer or computer system implementing a machine learning solution. Other embodiments relate to a computer processing system or computer-readable storage configured to perform such a method and to associated methods and computer systems configured to rotate a digital image.

BACKGROUND

Digital images, for example photos or videos stored as data, are pervasive in modern society. They can be and often are generated using a digital camera. There is now a high availability of digital cameras, including on multifunction devices like smart phones, in addition to dedicated cameras.

A digital image may be slightly titled or sometimes significantly tilted from an exact upright position. This may result in a reduction in the aesthetics of the image or a reduction in the orientation accuracy of the image, for example due to lines that should appear as vertical or horizontal not appearing correctly oriented. Both inexperienced and expert photographers often, even usually, take images that are slightly tilted from an exact upright position when intending to take the picture in an upright position.

Software or firmware may automatically process digital image data, for example digital image data generated by the image capture hardware of a digital camera or digital image data received from or via another source. Automatic processing may seek to reorient a digital image, for example by detecting edges or lines in the image and orienting the image with reference to the detected edges or lines. Hough transform may be used for detecting the edges or lines.

Software or firmware may also or instead allow for the manual adjustment of the orientation of a digital image. The software or firmware may form a part of a digital camera or other image generator, or may be run on a computer system separate from the digital camera or other image generator, which computer system has received digital image data for processing.

The present disclosure relates to methods for using machine learning based solutions to image processing, in particular for image rotation.

SUMMARY OF THE DISCLOSURE

Methods for generating image pairs for training a machine learning model for image processing are described. Also described are methods for training a machine learning model for image rotation using the image pairs, as well as methods for image processing to predict an image rotation value using a machine learning model so trained.

A computer-implemented method for generating image pairs for training a machine learning model for image processing includes:

for each of a plurality of target training images, forming at least one rotated image corresponding to that target training image, wherein each of the at least one rotated image is a version of the target training image rotated by a rotation value determined according to a random rotation selection process;

wherein:

the plurality of target training images have a target orientation for the machine learning model;

the image pairs are formed by a said target training image and a said rotated image corresponding to that target training image and wherein the method further includes associating each image pair with a classification, the classification for an image pair corresponding to that image pair's rotation value or a discretised rotation value for the rotation value.

A computer-implemented method for training a machine learning model for image rotation, includes:

for each of a plurality of pairs of images, including a target image representing a target rotational orientation and a rotated image having a tilt away from the target rotational orientation, wherein the tilt has a tilt value that is discretised and is within a set of discretised tilt values, the set of discretised tilt values comprising a plurality of different tilt values:

applying a machine learning model to the rotated image to determine a set of predicted class probabilities corresponding to the set of discretised tilt values;

determining a classification loss, wherein the classification loss is based on the tilt value and the set of predicted class probabilities;

updating the machine learning model based on an objective of minimising the classification loss.

A computer-implemented method for receiving data defining an image and determining and returning a predicted rotation value for the image includes applying, by a computer processing system, a trained machine learning model to the image, the trained machine learning model determining a class for the image, wherein the class is one of a plurality of classes defined by the machine learning model, wherein each of the plurality of classes is or is associated with a rotation value and wherein the rotation value is a said predicted rotation value for the image.

A computer-implemented method of providing an input to a machine learning model for an image includes:

dividing the image into a plurality of images, including at least a first image corresponding to a first part of the image and a second image corresponding to a second part of the image, different to the first part of the image;

forming a first feature vector for the first image and a second feature vector for the second image; and concatenating into a single vector the first feature vector and the second feature vector and providing the single vector as the input to the machine learning model.

Computer processing systems and non-transitory computer-readable storage storing instructions for a computer processing system are also described, which are configured to perform the methods disclosed herein.

Further embodiments will become apparent from the following description, given by way of example and with reference to the accompanying drawings.

DETAILED DESCRIPTION OF THE EMBODIMENTS

A machine learning solution to image processing tasks is implemented by a computer system. In particular, the computer system includes one or more data processing devices configured, for example by software, to perform a data processing method in accordance with the machine learning solution. The data processing method may be on one or more digital images in local or remote data non-transitory storage or which have been received over a communication channel and stored in transitory storage.

Figure 1:
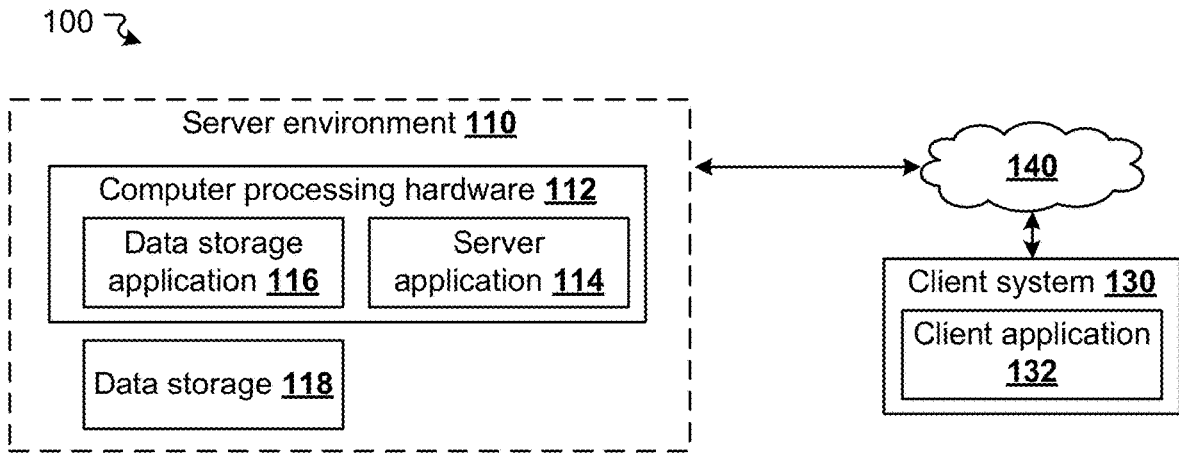
FIG. 1 shows an example of a computer system, in the form of a client server architecture.

FIG. 1 shows an example of a computer system, in the form of a client server architecture, for image processing tasks. A networked environment 100 includes a server environment 110 and a client system 130, which communicate via one or more communications networks 140, for example the Internet.

Generally speaking, the server environment 110 includes computer processing hardware 112 on which one or more applications are executed that provide server-side functionality to client applications. In the present example, the computer processing hardware 112 of the server environment 110 runs a server application 114, which may also be referred to as a front end server application, and a data storage application 116.

The server application 114 operates to provide an endpoint for a client application, for example a client application 132 on the client system 130, which is accessible over communications network 140. To do so, the server application 114 may include one or more application programs, libraries, application programming interfaces (APIs) or other software elements that implement the features and functions that are described herein, including for example to provide image processing. By way of example, where the server application 114 serves web browser client applications, the server application 114 will be a web server which receives and responds to, for example, HTTP application protocol requests. Where the server application 114 serves native client applications, the server application 114 will be an application server configured to receive, process, and respond to API calls from those client applications. The server environment 110 may include both web server and application server applications allowing it to interact with both web and native client applications.

In addition to the specific functionality described herein, the server application 114 (alone or in conjunction with other applications) may provide additional functions that are typically provided by server systems—for example user account creation and management, user authentication, and/or other server side functions.

The data storage application 116 operates to receive and process requests to persistently store and retrieve data in data storage that is relevant to the operations performed/services provided by the server environment 110. Such requests may be received from the server application 114, other server environment applications, and/or in some instances directly from client applications such as the client application 132. Data relevant to the operations performed/services provided by the server environment may include, for example, user account data, image data and/or other data relevant to the operation of the server application 114. The data storage is provided by one or more data storage devices that are local to or remote from the computer processing hardware 112. The example of FIG. 1 shows data storage 118 in the server environment 110 and the following description is made with reference to this device. The data storage 118 may be, for example one or more non-transitory computer readable storage devices such as hard disks, solid state drives, tape drives, or alternative computer readable storage devices.

In the server environment 110, the server application 114 persistently stores data to the data storage 118 via the data storage application 116. In alternative implementations, however, the server application 114 may be configured to directly interact with the data storage 118 to store and retrieve data, in which case a separate data storage application may not be needed. Furthermore, while a single data storage application 116 is described, the server environment 110 may include multiple data storage applications. For example one data storage application 116 may be used for user data, another for image data. In this case, each data storage application may interface with one or more shared data storage devices 118 and/or one or more dedicated data storage devices 118, and each data storage application may receive/respond to requests from various server-side and/or client-side applications, including, for example the server application 114.

As noted, the server application 114 and data storage application 116 run on (or are executed by) computer processing hardware 112. The computer processing hardware 112 includes one or more computer processing systems. The precise number and nature of those systems will depend on the architecture of the server environment 110.

For example, in one implementation a single server application 114 runs on its own computer processing system and a single data storage application 116 runs on a separate computer processing system. In another implementation, a single server application 114 and a single data storage application 116 run on a common computer processing system. In yet another implementation, the server environment 110 may include multiple server applications running in parallel on one or multiple computer processing systems.

Communication between the applications and computer processing systems of the server environment 110 may be by any appropriate means, for example direct communication or networked communication over one or more local area networks, wide area networks, and/or public networks (with a secure logical overlay, such as a VPN, if required).

The present disclosure describes various operations that are performed by applications of the server environment 110. Generally speaking, however, operations described as being performed by a particular application (e.g. server application 114) could be performed by one or more alternative applications, and/or operations described as being performed by multiple separate applications could in some instances be performed by a single application. Also the various operations may be performed in an environment other than a client server architecture. For example the various operations may be performed on a standalone computer system.

The client system 130 hosts the client application 132 which, when executed by the client system 130, configures the client system 130 to provide client-side functionality/ interact with sever environment 110 or more specifically, the server application 114 and/or other application provided by the server environment 110. Via the client application 132, a user can perform various operations such as receiving image data from another device such as a peripheral or from another computer, causing the displaying of images corresponding to the image data, and sending and receiving image data to and from the server environment.

The client application 132 may be a general web browser application which accesses the server application 114 via an appropriate uniform resource locator (URL) and communicates with the server application 114 via general world-wide-web protocols (e.g. http, https, ftp). Alternatively, the client application 132 may be a native application programmed to communicate with server application 114 using defined API calls.

The client system 130 may be any computer processing system which is configured or is configurable by hardware, firmware and/or software to offer client-side functionality. A client system 130 may be a desktop computer, laptop computers, tablet computing device, mobile/smart phone, or other appropriate computer processing system. Similarly, the applications of the server environment 110 are also executed by one or more computer processing systems. Server environment computer processing systems will typically be server systems, though again may be any appropriate computer processing systems.

Figure 2:
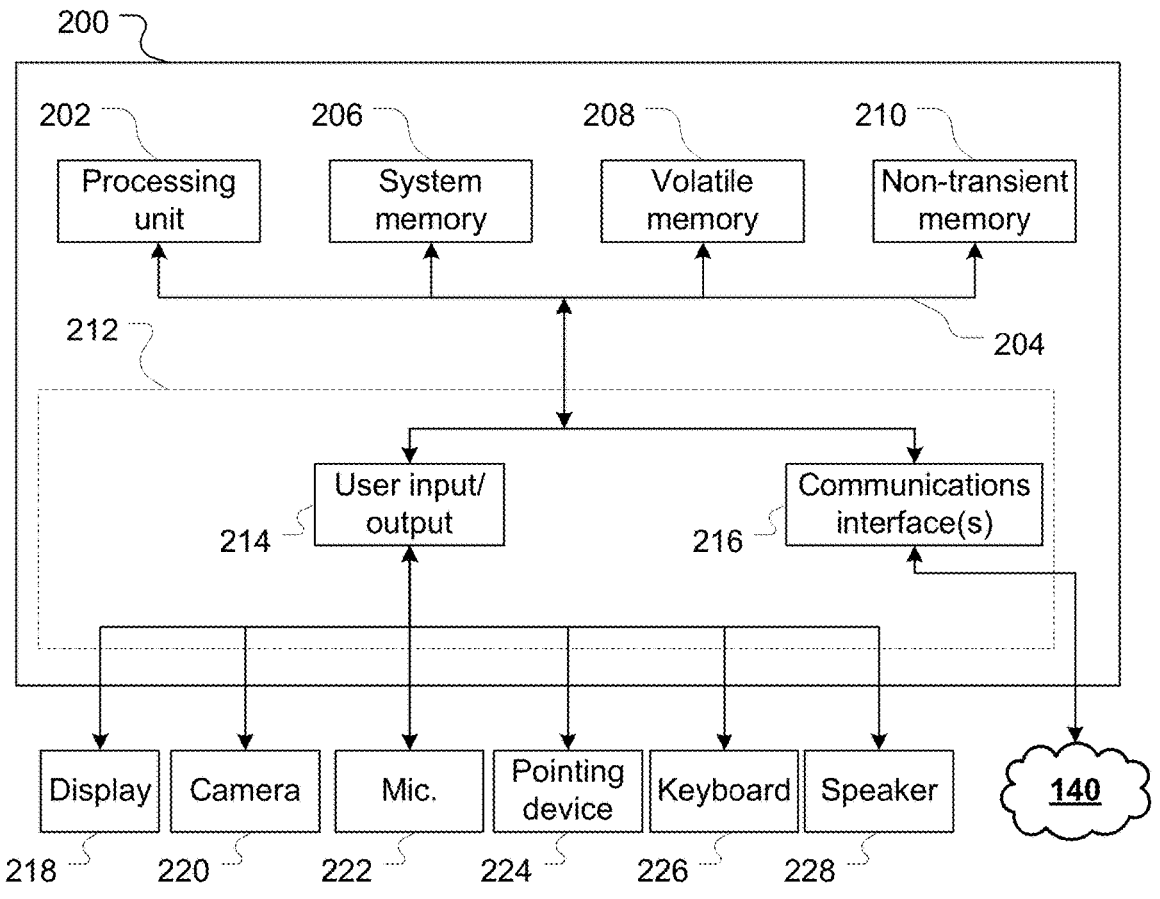
FIG. 2 shows a block diagram of a computer processing system.

FIG. 2 provides a block diagram of a computer processing system 200 configurable to implement operations described herein. The computer processing system 200 is a general purpose computer processing system. As such a computer processing system in the form shown in FIG. 2 may, for example, form a standalone computer processing system, form all or part of computer processing hardware 112, including data storage 118, or form all or part of the client system 130 (see FIG. 1). Other general purpose computer processing systems may be utilised in the system of FIG. 1 instead.

It will be appreciated that FIG. 2 does not illustrate all functional or physical components of a computer processing system. For example, no power supply or power supply interface has been depicted, however system 200 will either carry a power supply or be configured for connection to a power supply (or both). It will also be appreciated that the particular type of computer processing system will determine the appropriate hardware and architecture, and alternative computer processing systems suitable for implementing features of the present disclosure may have additional, alternative, or fewer components than those depicted.

The computer processing system 200 includes at least one processing unit 202. The processing unit 202 may be a single computer processing device (e.g. a central processing unit, graphics processing unit, or other computational device), or may include a plurality of computer processing devices. In some instances, where a computer processing system 200 is described as performing an operation or function all processing required to perform that operation or function will be performed by processing unit 202. In other instances, processing required to perform that operation or function may also be performed by remote processing devices accessible to and useable by (either in a shared or dedicated manner) the computer processing system 200.

Through a communications bus 204 the processing unit 202 is in data communication with one or more machine readable storage (memory) devices which store computer readable instructions and/or data which are executed by the processing unit 202 to control operation of the processing system 200. In this example the computer processing system 200 includes a system memory 206 (e.g. a BIOS), volatile memory 208 (e.g. random access memory such as one or more DRAM modules), and non-transitory memory 210 (e.g. one or more hard disk or solid state drives).

The computer processing system 200 also includes one or more interfaces, indicated generally by 212, via which computer processing system 200 interfaces with various devices and/or networks. Generally speaking, other devices may be integral with the computer processing system 200, or may be separate. Where a device is separate from the computer processing system 200, connection between the device and the computer processing system 200 may be via wired or wireless hardware and communication protocols, and may be a direct or an indirect (e.g. networked) connection.

Wired connection with other devices/networks may be by any appropriate standard or proprietary hardware and connectivity protocols. For example, the computer processing system 200 may be configured for wired connection with other devices/communications networks by one or more of: USB; eSATA; Ethernet; HDMI; and/or other wired connections.

Wireless connection with other devices/networks may similarly be by any appropriate standard or proprietary hardware and communications protocols. For example, the computer processing system 200 may be configured for wireless connection with other devices/communications networks using one or more of: BlueTooth; WiFi; near field communications (NFC); Global System for Mobile Communications (GSM), and/or other wireless connections.

Generally speaking, and depending on the particular system in question, devices to which the computer processing system 200 connects—whether by wired or wireless means—include one or more input devices to allow data to be input into/received by the computer processing system 200 and one or more output devices to allow data to be output by the computer processing system 200. Example devices are described below, however it will be appreciated that not all computer processing systems will include all mentioned devices, and that additional and alternative devices to those mentioned may well be used.

For example, the computer processing system 200 may include or connect to one or more input devices by which information/data is input into (received by) the computer processing system 200. Such input devices may include keyboard, mouse, trackpad, microphone, accelerometer, proximity sensor, GPS, and/or other input devices. The computer processing system 200 may also include or connect to one or more output devices controlled by the computer processing system 200 to output information. Such output devices may include devices such as a display (e.g. a LCD, LED, touch screen, or other display device), speaker, vibration module, LEDs/other lights, and/or other output devices. The computer processing system 200 may also include or connect to devices which may act as both input and output devices, for example memory devices (hard drives, solid state drives, disk drives, and/or other memory devices) which the computer processing system 200 can read data from and/or write data to, and touch screen displays which can both display (output) data and receive touch signals (input). The user input and output devices are generally represented in FIG. 2 by user input/output 214.

By way of example, where the computer processing system 200 is the client system 130 it may include a display 218 (which may be a touch screen display), a camera device 220, a microphone device 222 (which may be integrated with the camera device), a pointing device 224 (e.g. a mouse, trackpad, or other pointing device), a keyboard 226, and a speaker device 228.

The computer processing system 200 also includes one or more communications interfaces 216 for communication with a network, such as network 140 of environment 100 (and/or a local network within the server environment 110). Via the communications interface(s) 216, the computer processing system 200 can communicate data to and receive data from networked systems and/or devices.

The computer processing system 200 may be any suitable computer processing system, for example, a server computer system, a desktop computer, a laptop computer, a netbook computer, a tablet computing device, a mobile/smart phone, a personal digital assistant, or an alternative computer processing system.

The computer processing system 200 stores or has access to computer applications (also referred to as software or programs)—i.e. computer readable instructions and data which, when executed by the processing unit 202, configure the computer processing system 200 to receive, process, and output data. Instructions and data can be stored on non-transitory memory 210. Instructions and data may be transmitted to/received by the computer processing system 200 via a data signal in a transmission channel enabled (for example) by a wired or wireless network connection over an interface, such as communications interface 216.

Typically, one application accessible to the computer processing system 200 will be an operating system application. In addition, the computer processing system 200 will store or have access to applications which, when executed by the processing unit 202, configure system 200 to perform various computer-implemented processing operations described herein. For example, and referring to the networked environment of FIG. 1 above, server environment 110 includes one or more systems which run a server application 114, a data storage application 116. Similarly, client system 130 runs a client application 132.

In some cases part or all of a given computer-implemented method will be performed by the computer processing system 200 itself, while in other cases processing may be performed by other devices in data communication with system 200.

Figure 3:
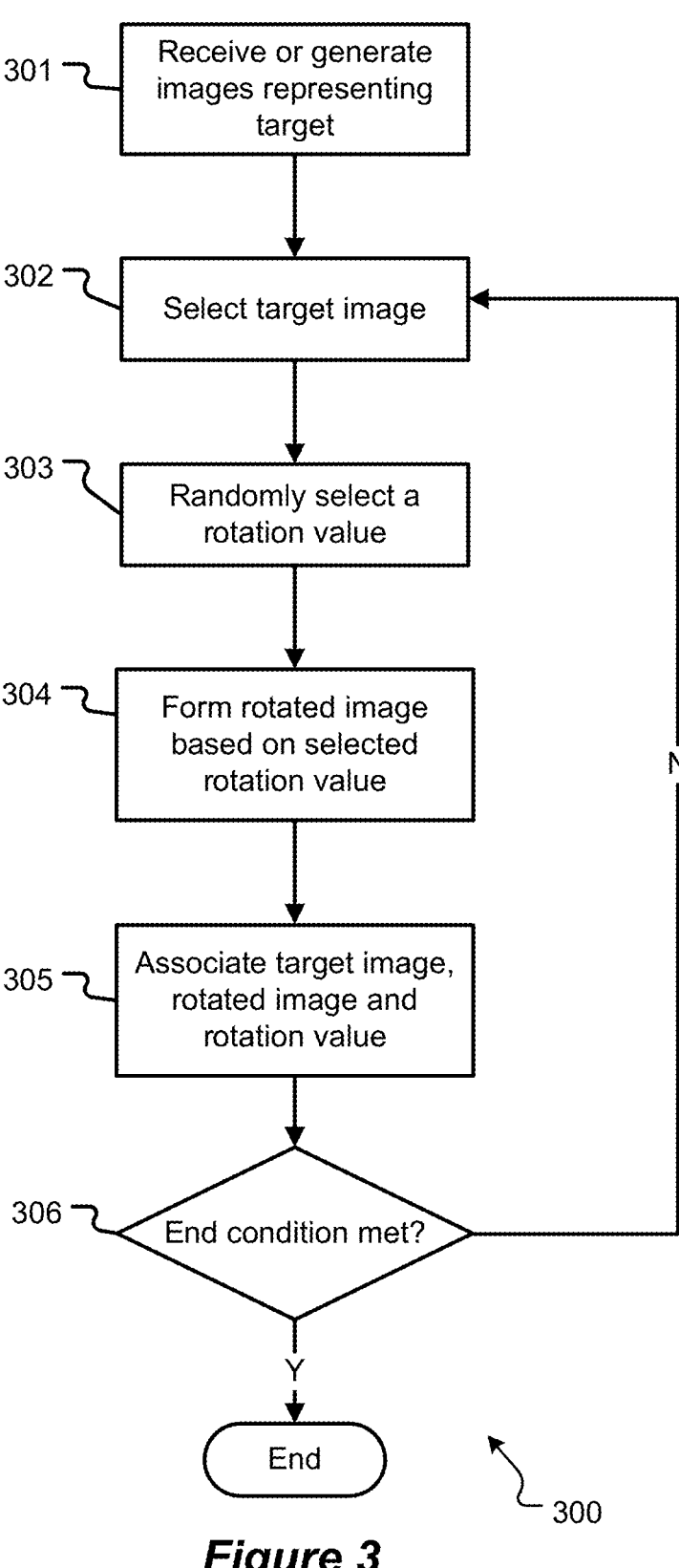
FIG. 3 shows a method for generating a set of training images for supervised machine based learning.

FIG. 3 shows an embodiment of a method 300, performed by a computer processing system. The operations of the method 300 may be performed, for example, by an instance of the computer processing system 200.

The method 300 is a method for generating a set of training images for supervised machine based learning. The method 300 may be performed during the machine based learning, or as an antecedent to machine based learning. The arrangement of steps in FIG. 3 and the arrangement of the steps in the other figures representing methods is not intended to limit the disclosure to only the order of steps shown, or intended to limit the disclosure to only serial or only parallel processing for any steps.

In step 301 a set of target images is received or generated. The target images represent are images with a target orientation, for example an exact or close to exact upright position. The set of target images may have a different target orientation, for example if an effect is required other than correcting an image's orientation to an estimate of its correct upright position. For brevity and clarity of explanation, it is assumed throughout the remainder of the specification that a goal of the machine learning model is to rotate an image to an upright orientation.

The images in the set of target images may be selected from a set of available images based on knowledge that they are in an upright orientation or based on an evaluation, for example an expert evaluation that they are in an upright orientation. Alternatively or additionally the images in the set of target images may be generated, with the generation configured or constrained to ensure the images are in an upright orientation.

The images in the set of target images may include images of different scenes or types. An example of a scene or type of image is an image of buildings. Another example is an image of plants. Further examples are images including a horizon, a person, an animal, food. For general training of a machine learning model the set of target images may be across a substantial number of different scenes or types. Alternatively, where the training is for a particular scene or type or image, then the set of target images may be solely or predominantly of that scene or type. The number of images in each class may be substantially uniform or may be weighted towards certain classes, for example based on an expected distribution of images to be rotated by a trained machine learning model using training images generated according to the method of FIG. 3. Alternatively, a random selection from the set of target images (see herein below) may be weighted to achieve a similar effect.

A large set of target images is useful for machine learning. By way of example, there may be 5,000 to 100,000 target images, or any number in-between. In other examples there may be more than 100,000 target images.

In step 302 a target image is selected from the set of target images. The selected target image is to be used for training and is therefore referred to herein as a target training image. In some embodiments the selection is random. As used herein, the term random is intended to encompass quasi-random processes.

In step 303 a random rotation is selected or in other words a random tilt is selected. For example a random selection of an angle of rotation may be performed.

In some embodiments the random selection is constrained, for example within a range of plus (clockwise) or minus (counter-clockwise) 15 degrees. This may represent a range in which most users (e.g. photo takers and/or manual editors of digital images) orient their images when capturing an image or when editing it later. Other constraints may be used that are less than plus or minus 15 degrees (e.g. 10 degrees or 5 degrees) or more than plus or minus 15 degrees (e.g. 20 degrees or 25 degrees). The constraint need not be defined by integer value. It is expected that in most embodiments the range will be symmetrical about and include the target orientation of upright.

In some embodiments in which the random selection of a rotation value is constrained by a first constraint, the first constraint is not applied in some instances. In particular, in some embodiments a portion, for example a small portion like about 1 percent, of the target training images are rotated by an amount outside of the range specified by the first constraint. The rotation is still randomly selected, but according to a second constraint that requires or results in according to probability rotation values outside of the first constraint. Taking for example a first constraint of 30 degrees formed by plus or minus 15 degrees inclusive, the second constraint may be plus or minus 15 degrees to 35 degrees (inclusive or exclusive of either value) or may be any angle outside of plus or minus 15 degrees.

In some embodiments the range of rotations available for selection is discretised, or a selected value from a substantially continuous range is rounded to a nearest discretised value. If a selected value matches a discretised value, then it may be used without rounding. By way of example, if the rotations are expressed as angles, then the discretised values may have a step size of 0.1 degrees, which for a 30 degree range (e.g. plus or minus 15 degrees), results in 301 rotations available for selection in step 303. The step size may be less than or more than 0.1 degrees. The step size may be uniform across the range or non-uniform, for example with higher density for lower rotation values and lower density for higher rotation values.

In step 304 a rotated image is formed based on the selected rotation. For example, where the randomly selected rotation is or corresponds to +5.0 degrees, the target training image selected in step 302 is rotated clockwise by 5 degrees to form a corresponding rotated image.

The combination of the rotated image formed in step 304, together with its corresponding target training image from step 302 forms an image pair. As described later herein, a collection of image pairs generated in this manner may be used for machine learning. Accordingly, in step 305, the pair association of the two images, together with the rotation values selected in step 303 for that pair, is recorded by the computer processing system, for example in a lookup table or otherwise.

In some embodiments, the rotation values or equivalently the rotated images are each treated as a class. For example a rotation value of +5.0 degrees (or image rotated by +5.0 degrees) is one class, a rotation value of −5.0 degrees (or image rotated by −5.0 degrees) is another class, and a rotation value of +5.1 degrees (or image rotated by +5.1 degrees) is still another class.

As described above, in some embodiments a portion of the selected rotation values are outside of a first constraint, for example outside of plus or minus 15 degrees. In some embodiments these are all treated as in a different class to the classes encompassing the range specified by the first constraint, but in one or more common classes. For example, all rotation values outside of plus or minus 15 degrees may be allocated to a common class. Whilst the designation of the common class is somewhat arbitrary, in one example its designation may be absolute value 15 degrees. Accordingly, for this example in step 305 the association of a rotated image (and its associated target image) that has been rotated outside of plus or minus 15 degrees is associated with a class of absolute value 15 degrees instead of a class based on its actual rotation relative to the target image.

In step 306 a determination is made whether an end condition has been met. In some embodiments the end condition is the generation of a certain number of image pairs. A large set of image pairs is useful for machine learning. By way of example, there may be 5,000 to 100,000 image pairs, or any number in-between. In other examples there may be more than 100,000 image pairs. In some embodiments there are more image pairs than there are target images. In some embodiments there are substantially more image pairs than there are target images, for example 10 times the number, 100 times the number or more, effectively guaranteeing that a single target image will appear in more than one image pair, but with different rotated images due to the random selection of step 303.

If the end condition is not met, the method returns to step 302 for another selection of a target image. In some embodiments, in particular those involving random selection in step 302, each selection is made from the full set of available target images. In other embodiments when a target image is selected it is removed from the set of available target images for future iterations. If the number of iterations is larger than the number of target images, then when no target images remain, the full set of available target images may be made available for selection again. If the end condition is met, the process ends. In still other embodiments, steps 302 and 303 may be effectively combined, with every target image being rotated one or more times, by a randomly selected rotation value.

In variations to the method for generating a set of training images for supervised machine based learning the order of the steps may be varied and steps changed to accommodate a different processing procedure, without substantially changing the generation of image pairs and associated rotation values. By way of example, the order of steps 301 to 303 may be changed, for instance so that only selected target images are received or generated (i.e. step 301 is performed after step 302). In addition the selection of a rotation value may precede the selection of a target image or the receipt or generation of the target image. In another example the process is not iterative with reference to an end condition. A non-iterative process may involve selecting all target images and all rotation values in combined selection processes.

In some embodiments only pairs of images generated using random selection of a rotation value, for example as described herein above, are used for machine learning. In other embodiments these are used in combination with pairs of images and associated rotation values from one or more other sources. In various embodiments the pairs generated based on a random selection of a rotation angle form at least 20% or 30% or 40% or 50% or 60% or 70% or 80% or 90% of the image pairs used for machine learning.

Figure 4:
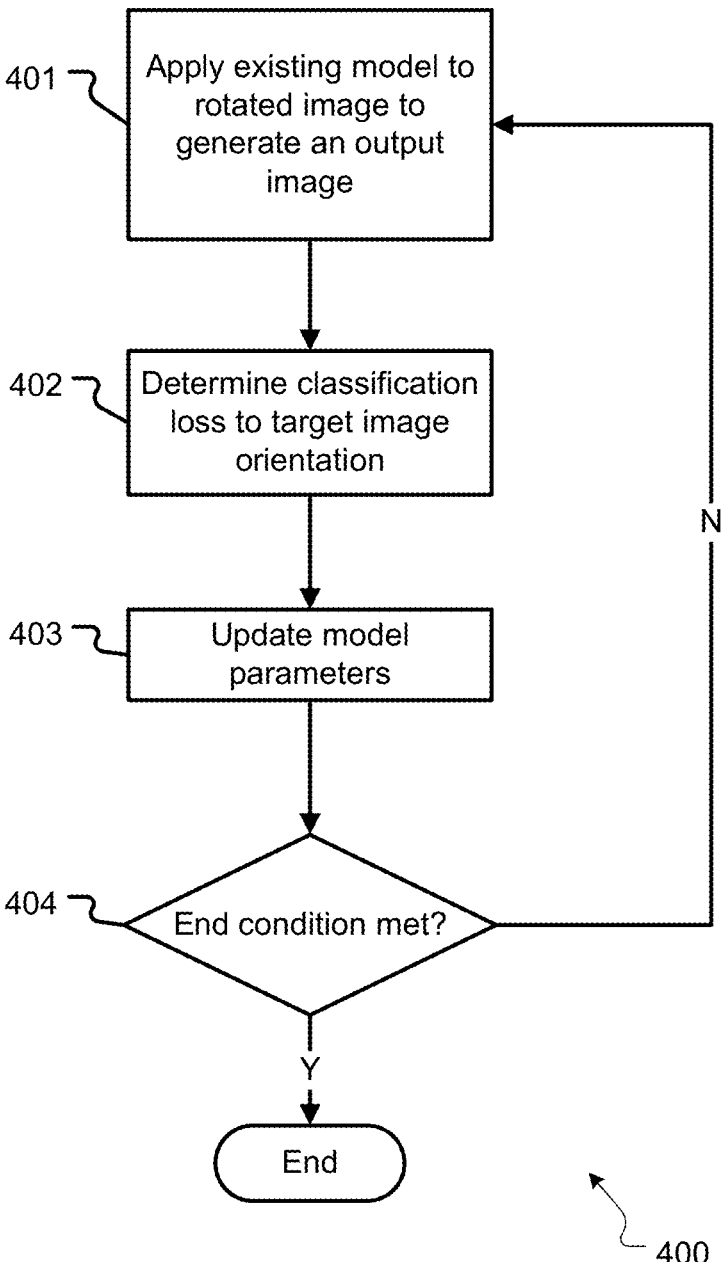
FIG. 4 shows a method for machine learning based on a generated set of training images including image pairs, which may be generated in accordance with the method of FIG. 3.

FIG. 4 shows an embodiment of a method 400, performed by a computer processing system. The operations of the method 400 may be performed, for example, by an instance of the computer processing system 200, in combination with implementation of the method 300. The method 400 is a method for machine learning based on a generated set of training images including image pairs. The image pairs include a target image, a rotated image and a rotation value indicating the amount the rotated image is tilted relative to the target image.

The rotation value is treated as a class for machine learning purposes. Accordingly the rotation values may be discretised rather than being continuous or substantially continuous, for example into increments of 0.1 degrees of rotation. There may also be one or more classes representing a range of rotation values, for example a class to incorporate all rotations outside of a certain range such as plus or minus 15 degrees. All, some or none of the image pairs may be generated in accordance with the method 300 or a similar method involving random selection of the rotation values and generation of the rotated image based on the random selection.

In step 401 data defining a rotated image of an image pair is received or retrieved from data storage and an existing machine learning (ML) model is applied, the ML model configured with existing model parameters. The application of the ML model to the rotated image generates an output image.

In the first iteration of the method 400 the existing model parameters have initialised values. Taking the example of ML model in the form of a neural network, for instance a convolutional neural network (CNN), initialisation may include setting all weights of the ML Model to random values, according to a normal probability distribution or otherwise. Alternatively, and in particular for a convolutional neural network, initialisation may include using pre-trained weights, for example based on a preceding training of the ML model. The ML model may be in a different form, for example a multilayer perceptron (MLP) network. In some embodiments the ML model is a 2-hidden layered MLP network.

The data defining a rotated image may be in the form of a feature vector. If the data defining the rotated image is the image data itself, then a feature vector may be formed from the image data, for input to the ML model. The feature vector of an image may be generated based on the image by a pre-trained convolutional neural network (CNN) model. From the last CNN layer, 3D convolutional features are extracted and are converted into 1D feature vectors by computing a Global Average Pooling (GAP). In some embodiments the MobileNet V3 model may be utilised to generate feature vectors, which model was described in the paper "Searching for MobileNetV3" by Howard et al, published by arXiv.org (citation arXiv:1905.02244v5). In other embodiments, alternative models may be used. For example such models may include, AlexNet, ConveXt, DenseNet, EfficientNetV2, and GoogLeNet which form part of PyTorch, a project of the Linux Foundation.

In step 402, a classification loss is determined, for example a multi-classification cross entropy loss. A neural network may predict class probabilities for the various classes and provide an output of the probabilities. The loss is computed between the predicted class probabilities and the class probabilities for the target image. The class probabilities for the target image are a probability of 1 (i.e. 100%) for an image of the same tilt class as the target image and a probability of 0 (i.e. 0%) for an image of any other tilt class.

Minimisation of the loss is a goal of the ML model and in step 403 the ML model parameters are updated based on the determined classification loss. Continuing with the example of a neural network, the updating may be by backpropagation, utilising gradient descent. Thus, model parameters are updated in a manner such that it should predict an angle as close as possible to the angle of the target image.

In step 404 a determination is made whether or not an end condition has been met. The end condition may, for example, be the classification loss reaching a threshold value. If the classification loss is determined to have not reached the threshold value, the classification accuracy on the validation data can be improved and the process returns to step 401 and a further iteration is performed, based on another image pair and using the updated model parameters. If the end condition has been met, then training is complete.

Figure 5:
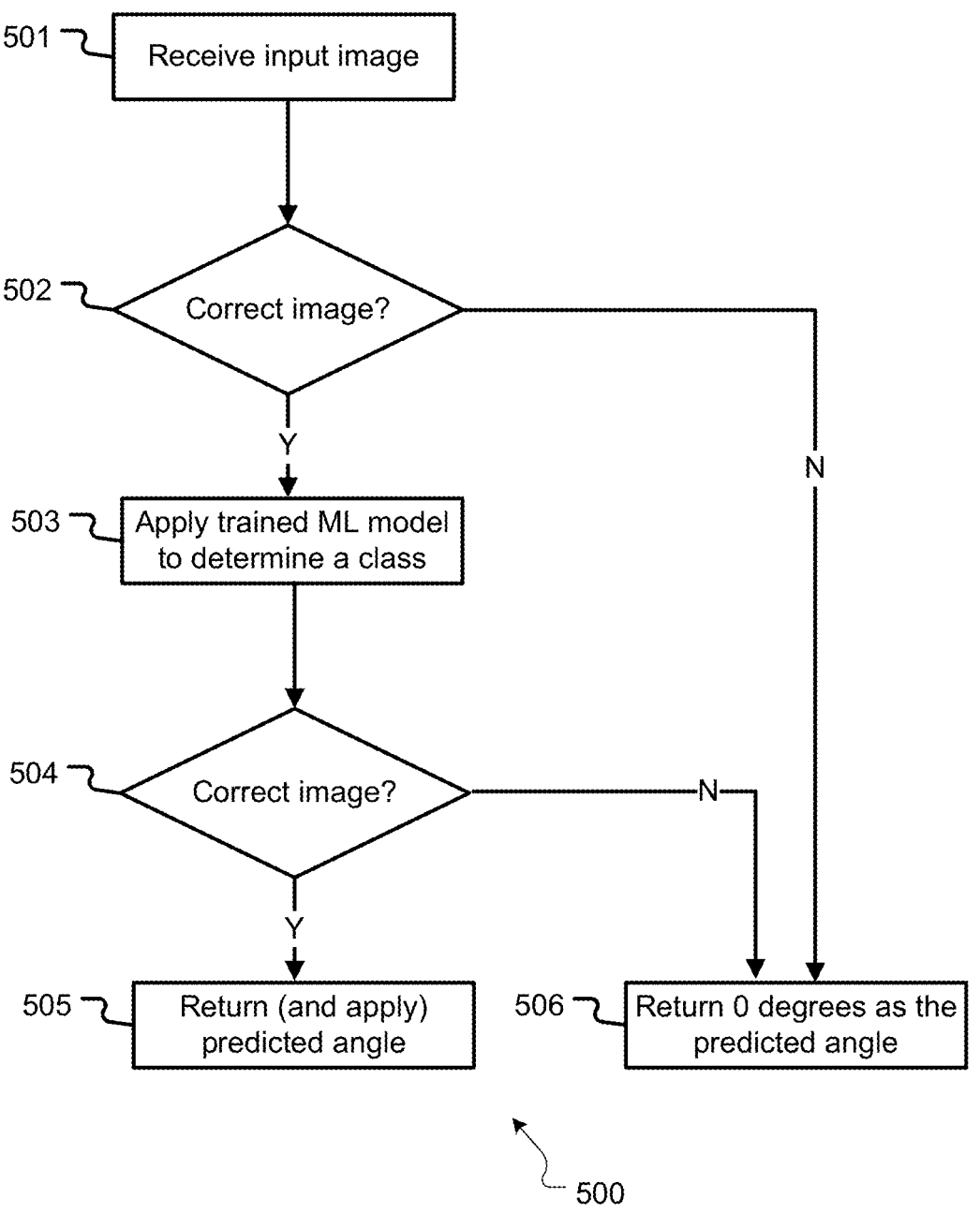
FIG. 5 shows a method for determining an image rotation for an image by applying a trained machine learning model, which may have been trained in accordance with the method of FIG. 4.

FIG. 5 shows an embodiment of a method 500, performed by a computer processing system. The operations of the method 500 may be performed, for example, by an instance of the computer processing system 200. The method 500 is a method for determining an image rotation for an image by applying a trained ML model.

In step 501 an input image is received, for example by a processor of the computer processing system after retrieving the image data from memory or receiving it over a communication channel. The input image may, for example, be an image taken by a digital camera and may be slightly tilted or significantly tilted from an exact upright position.

In step 502 the computer processing system determines whether to correct the rotation of the image. If not, the method proceeds to step 506—a zero rotational correction is returned as the predicted angle for rotational correction. The effect of the determination of step 502 may be viewed as an initial filter for images that should and should not be rotated. The filter may be applied, for example, as part of automated image processing but could also be applied in response to a manual request for application of the trained ML model.

By way of background to step 502, the trained ML model looks for rotation information or clues in the images to determine a prediction for a rotation to bring the image to an exact upright position. However for some images this rotation information is either not clear or not defined. Step 502 accommodates for at least some of these images by seeking to identify them and not predict any rotation for them. Examples of images that may be filtered from the prediction process by step 502 may include: an image of a circular symmetric object, such as some flood plates, flowers and cups; an image of texture-less foreground, such as an image of tiles or of the sky; an image where various objects are cluttered so that no reliable rotation information is available; an image of texture without any clear rotation information, such as water waves, matte tiles, sand, or dotted patterns; and an image of a close-up shot, such a close-up of an object or face.

Step 502 is performed by a trained classifier model. The model is trained in a supervised manner based on images of two classes: a) images where rotation is defined, or in other words images that are predetermined to warrant an answer of yes to the determination at step 502, and b) images where rotation is either unknown or not defined, or in other words images that are predetermined to warrant an answer of no to the determination at step 502. In some embodiments the model is a neural network. In some embodiments the model is a convolutional neural network. In some embodiments the classifier model is trained with binary cross entropy loss, with an objective of maximising the correct classification on the validation data.

In other embodiments step 502 is omitted. In that case all images may be processed to return a predicted angle and may also automatically rotate the image in accordance with the predicted angle. In these and other embodiments, including embodiments including step 502, the computer processing system may provide a mechanism for the user to review and accept or reject the change.

If in step 502 the trained classifier model determines that the image should be corrected, the method proceeds to step 503. In step 503 the computer processing system applies a trained ML model. The training of the trained ML model may have been performed using the method 400 described with reference to FIG. 4, which as described herein may utilise one or more image pairs generated using the method 300 described with reference to FIG. 3 or another method utilising random rotation value selection to generate image pairs. The trained ML model generates a rotation prediction, for example a predicted angle, for the image. As described with reference to FIG. 4, the trained ML model may have been trained on the basis of classification loss. Accordingly, the rotation prediction that is generated may be viewed as a rotation classification or in other words the predicted angle may be viewed as an angle classification. The method then proceeds to step 504.

In step 504 the computer processing system makes a determination whether to return or apply the rotation prediction. Like step 502, the effect of the determination of step 504 may be viewed as a filter for images that should and should not be rotated. In various embodiments the computer processing system may be configured or configurable through a settings interface to apply both filters, to apply only one or the other of the filters, or apply neither filter.

The determination in step 504 is a determination based on what class the rotation prediction is in. A determination that the rotation prediction is in one or more first classes results in the method proceeding to step 505, in which case the generated rotation prediction is returned and in some embodiments automatically applied without further user input. A determination that the rotation prediction is in one or more second classes, different to the one or more first classes, results in the method proceeding to step 506, with no rotation or a zero rotation prediction being returned.

In a specific example, consistent with an example previously described herein, rotation angles of plus or minus 15 degrees in 0.1 degree increments may be allocated to individual classes and all rotation values outside of plus or minus 15 degrees may be allocated to a common class of an absolute value of 15 degrees. Step 504 may determine that the image is to be corrected, by returning or applying a predicted angle in step 505, if the rotation prediction is any of the classes associated with the plus or minus 15 degree range. Step 504 may determine that the image is not to be corrected, by returning a zero rotation angle or otherwise not applying a non-zero predicted angle in step 506, if the rotation prediction is in the class of absolute value 15 degrees.

Although the preceding description has as classes angles of rotation, in other embodiments the classes may be given any labels. For example a class labelled "AA" may be associated with minus 15 degrees, a class "AB" associated with minus 14.9 degrees, a class "AC" associated with minus 14.8 degrees and so forth. The trained ML model will then determine a class, for example AB. The predicted rotation angle to be returned would then be determined by identifying the angle associated with class AB, in this case minus 14.8 degrees.

To facilitate training and application of the ML model to determine a class for image rotation, the image input to the ML model for training or for image prediction may have a squared dimension. For example, CNNs may require a fixed squared dimension of input data, for example data defining pixels arranged in a square, such as 224×224 pixels, 320× 320 pixels or 480×480 pixels.

A squared dimension input image may have been formed based on a non-square image, for example a rectangular image. Resizing a rotated image into a fixed squared dimension image does not necessarily keep the edge orientations the same as the original image. For example, if the original rotated image is of portrait or landscape type, then by resizing into a squared aspect ratio would slightly shift the orientation of all the edges and lines in the image. Thus, training a model on such squared images and without preserving actual edge orientation may adversely affect the performance of the model.

Figure 6:
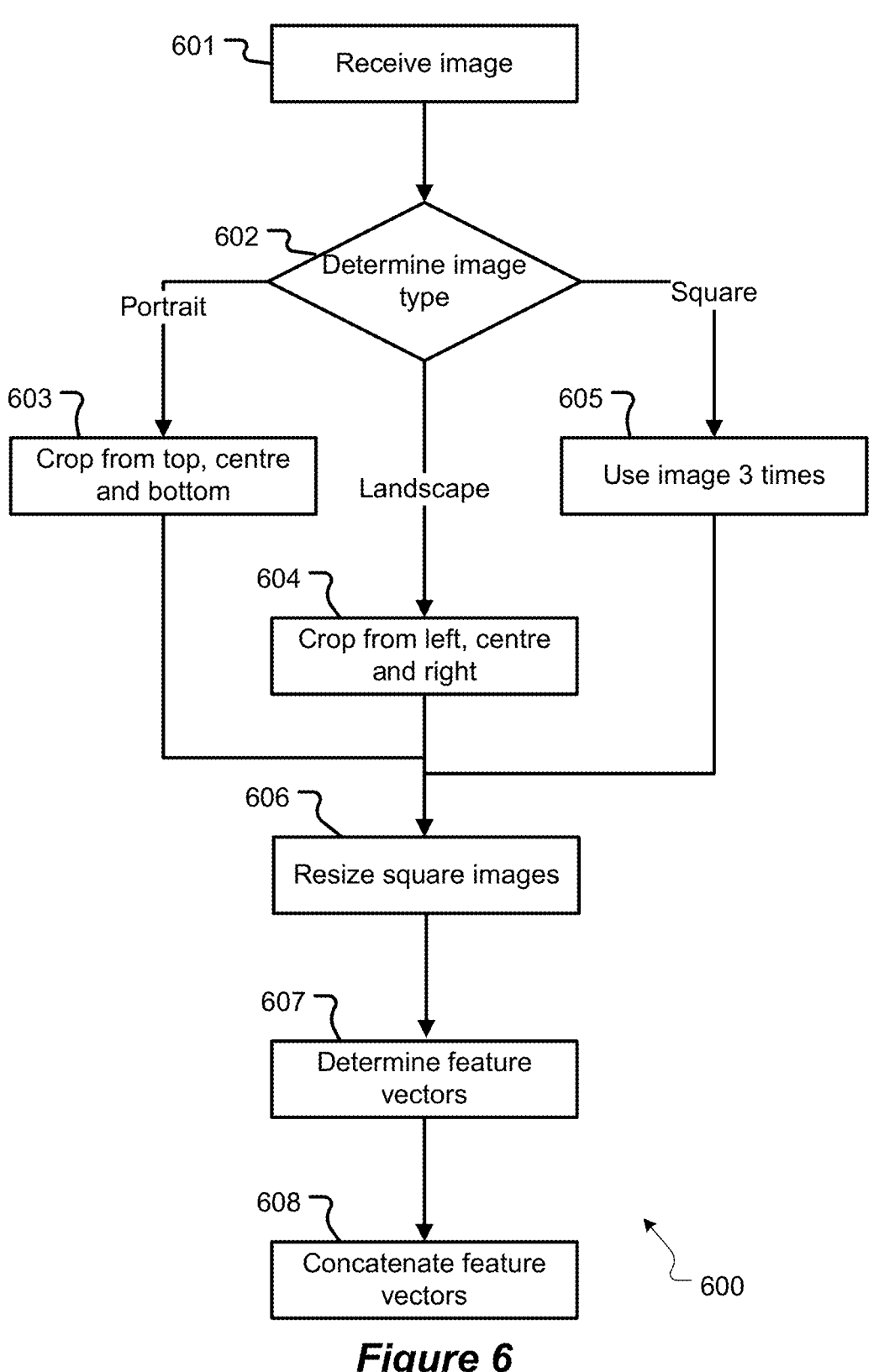
FIG. 6 is a method for creating an input for a machine learning model that represents an image. The method may be used in conjunction with the methods of FIGS. 4 and 5.

FIG. 6 shows an embodiment of a method 600, performed by a computer processing system. The operations of the method 600 may be performed, for example, by an instance of the computer processing system 200. The method 600 is a method for creating an input for a ML model that represents an image.

In some embodiments the method 600 is performed in combination with the method 400 described with reference to FIG. 4. In particular, in step 401 of the method 400 the existing model is applied to an input generated according to the method 600 of FIG. 6. In some embodiments the method 600 is performed in combination with the method 500 described with reference to FIG. 5. In particular, in step 503 of the method 500 the existing model is applied to an input generated according to the method 600 of FIG. 6. In some embodiment the method 600 is performed to generate input to a ML model both during training of the ML learning (e.g. according to the method 400) and during use of the trained ML learning (e.g. according to the method 500).

In step 601 data defining an image is received. The data may define a rectangular image of either portrait or landscape orientation, or a square image, for example as defined by pixel counts across the horizontal and vertical dimensions.

In step 602 the computer processing system determines whether the image is a portrait image, a landscape image or a square image. When the determination is a portrait image, the process proceeds to step 603. When the determination is a landscape image, the process proceeds to step 604. When the determination is a square image, the process proceeds to step 605.

In step 603 three square images are cropped from the portrait image. A first image is cropped from the top of the image, a second image is cropped from the centre of the image (i.e. a centroid of the square image is coincident with a centroid of the portrait image) and a third image is cropped from the bottom of the image. The method then proceeds to step 606.

In step 604 three square images (the same number as in step 603) are cropped from the landscape image. A first image is cropped from the left of the image, a second image is cropped from the centre of the image (i.e. a centroid of the x by x square image is coincident with a centroid of the landscape image) and a third image is cropped from the right of the image. The method then proceeds to step 606.

In step 605 same image is determined to be used three times, to match the number of cropped images formed in steps 603 and 604. In some embodiments this determination is implicit from the determination in step 602 that the image is square, rather than a separate determination by the computer processing system. The method then proceeds to step 606.

Figure 7:
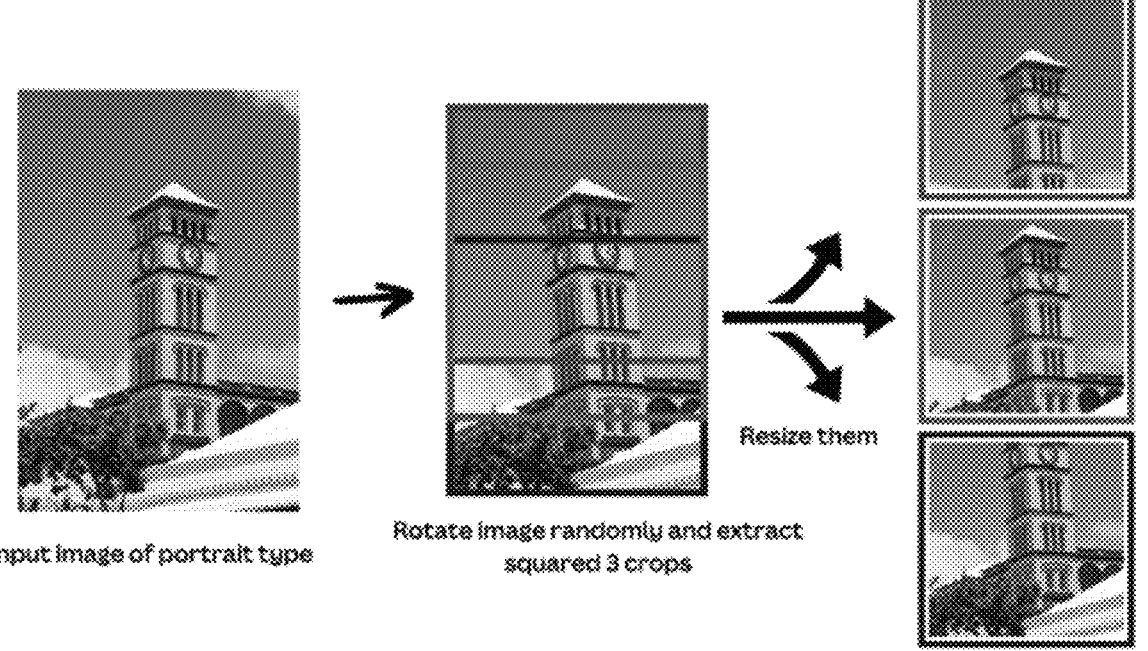
FIG. 7 depicts an example division of an image, in preparation for training a machine learning model or applying a trained machine learning model.

FIG. 7 shows an example a portrait target training image (the image on the left), a rotated image (the centre image) with the boundaries for cropping overlaid and a set of three square cropped images (the images on the right). The three cropped images overlap with at least their adjacent image and as shown in FIG. 7 may overlap with both of the other two cropped images. The cropping of a landscape target training image may be performed equivalently, cropping a rotated image from left, centre and right instead of from the top, centre and bottom.

In step 606 if the three square images from steps 603 to 605 are not of a required size for provision to a ML model, then the image is processed by the computer processing system to upscale to the required size or downscale to the required size, maintaining the aspect ratio. Since the images are all square, resizing them into fixed squared dimensions preserves the edge orientation information. For example, all images may be upsized to downsized as required to have a common size, for example x by x pixels, where x is 224, 320, or 480.

In step 607 the computer processing system determines or generates a feature vector for each of the three images resulting from step 606. As described previously herein, a feature vector of an image may be generated based on the image by a pre-trained convolutional neural network (CNN) model. From the last CNN layer, 3D convolutional features are extracted and are converted into 1D feature vectors by computing a Global Average Pooling (GAP). The MobileNet V3 model may be utilised to generate feature vectors, which model was described in the paper "Searching for Mobile-NetV3" by Howard et al, published by arXiv.org (citation arXiv:1905.02244v5). The method then proceeds to step 607.

In step 608 a single vector is formed for the image. A single vector may be formed from the three feature vectors determined or generated in step 607 by concatenating the feature vectors. The concatenation is in the same order for each image that is processed according to the method 600. The single vector resulting from concatenation may be an input to a ML model that represents the portrait, landscape or square image.

While the method 600 of FIG. 6 involves the cropping of three images from a received image, in other embodiments two images or four or more images are cropped and in the case of a square image, the image is used a corresponding number of times, so that the single vector formed by concatenation of the feature vectors is the same length.

Figure 8:
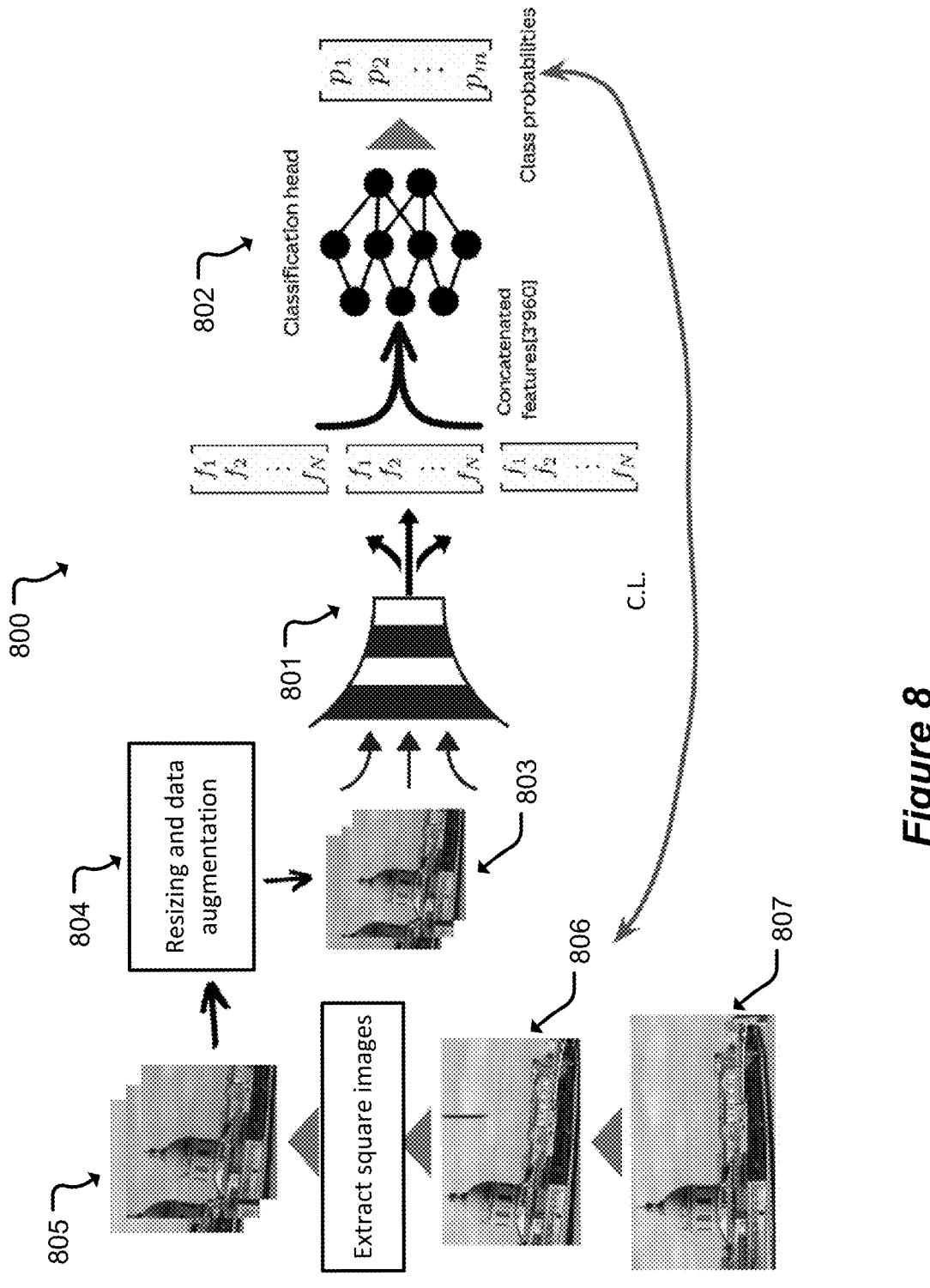
FIG. 8 shows a diagrammatic representation of a machine learning architecture.

FIG. 8 shows a diagrammatic representation of a machine learning architecture 800, configured to be trained to predict rotation values for images, based on a set of training images, and once trained to predict a rotation value for an image. FIG. 8 also diagrammatically represents processes for generating training images and for training the machine learning architecture.

The machine learning architecture includes a pre-trained neural network 801 and a classification head 802. The pre-training of the neural network 801 is training to generate a feature vector for each of a plurality of input images 803. The input images 803 are of a predetermined size, for example 480 by 480 pixels, resulting from a resizing process and a data augmentation process 804 applied to square images 805 extracted from a rotated image 806. In some embodiments the data augmentation process includes changing the colours of the image by way of altering one or more of brightness, saturation, contrast. It may also or instead include blurring the image. In some embodiments the image may not be augmented at all. The aforementioned augmentation operations may be randomly sampled along with their amount/strength, however, the same operations and the associated amount/strength corresponding to the operations will be applied to all square images 805. The rotated image 806 may be part of a training image pair, together with a target image 807. The pre-trained neural network 801 may be the aforementioned MobileNet V3 model or another suitable model and example processes for generating image pairs for training, extracting square images and resizing them are also described herein.

For three input images 803, three feature vectors are generated. The feature vectors may, for example, each have a length of 960. These are concatenated into a single vector of length 2880 and input to the classification head 802. The classification head determines class probabilities $p_1$ to $p_m$. During training a classification loss (indicated by arrow C.L. in FIG. 8) is determined based on the determined class probabilities $p_1$ to $p_m$ and a known rotation between the rotated image 806 and the target image 807. An example process for determining classification loss was described with reference to step 402 of FIG. 4. During application of the trained architecture, the returned predicted rotation is the rotation corresponding to the highest probability of the class probabilities $p_1$ to $p_m$.

Without limiting the foregoing disclosure, particular embodiments of the present disclosure are described by the following clauses.

Clause A1: A computer-implemented method for generating image pairs for training a machine learning model for image processing, the method including:

for each of a plurality of target training images, forming at least one rotated image corresponding to that target training image, wherein each of the at least one rotated image is a version of the target training image rotated by a rotation value determined according to a random rotation selection process;

wherein:

the plurality of target training images have a target orientation for the machine learning model;

the image pairs are formed by a said target training image and a said rotated image corresponding to that target training image and wherein the method further includes associating each image pair with a classification, the classification for an image pair corresponding to that image pair's rotation value or a discretised rotation value for the rotation value.

Clause A2: The computer-implemented method of Clause A1, further including:

determining the plurality of target training images from a plurality of target images according to a random image selection process.

Clause A3: The computer-implemented method of Clause A2, further including repeating the random selection process so that a number of images in the plurality of target training images is greater than a number of images in the plurality of target images.

Clause A4: The computer-implemented method of Clause A2, wherein a first target training image forms one part of a plurality of the image pairs, each of the plurality of the image pairs having a different said rotated image.

Clause A5: The computer-implemented method of any one of Clauses A1 to A4, wherein the random rotation selection process is constrained to a set or range of selectable rotation values.

Clause A6: The computer-implemented method of Clause A5, wherein the set or range of selectable rotation values represent a clockwise or counter-clockwise rotation value.

Clause A7: The computer-implemented method of Clause A5, wherein the set or range of selectable rotation values represent a clockwise or counter-clockwise rotation value of: a) 25 degrees or a value less than 25 degrees; or b) 20 degrees or a value less than 25 degrees or c) 15 degrees or a value less than 15 degrees.

Clause A8: The computer-implemented method of any one of Clauses A5 to A7, wherein the random rotation selection process is a first random rotation selection process and the method further comprises forming a plurality of further image pairs, in addition to the image pairs, by a process including:

for each of a plurality of the target training images, determining according to a second random rotation selection process, at least one rotation value for the target training image;

for each of the plurality of target training images, forming at least one further rotated image corresponding to that target training image, wherein each of the at least one further rotated image is a version of the target training image rotated by a said rotation value determined according to the second random rotation selection process;

wherein:

the second random rotation selection process determines at least one rotation value outside of the set or range of selectable rotation values;

the further image pairs are formed by a said target training image and a said further rotated image corresponding to that target training image and wherein the method further includes associating each further image pair with a classification, the classification distinguishing each of the further image pairs as a class from the image pairs.

Clause B1: A computer-implemented method for training a machine learning model for image rotation, the method including:

for each of a plurality of pairs of images, including a target image representing a target rotational orientation and a rotated image having a tilt away from the target rotational orientation, wherein the tilt has a tilt value that is discretised and is within a set of discretised tilt values, the set of discretised tilt values comprising a plurality of different tilt values:

applying a machine learning model to the rotated image to determine a set of predicted class probabilities corresponding to the set of discretised tilt values;

determining a classification loss, wherein the classification loss is based on the tilt value and the set of predicted class probabilities;

updating the machine learning model based on an objective of minimising the classification loss.

Clause B2: The method of Clause B1, wherein:

the step of applying a machine learning model to the rotated image to determine a set of predicted class probabilities corresponding to the set of discretised tilt values includes determining at least one further predicted class probability that does not correspond to a discretised tilt value of the set of discretised tilt values; and the classification loss is also based on the at least one further predicted class probability.

Clause B3: The method of Clause B2, wherein the set of discretised tilt values corresponds a first range of tilt values and wherein the at least one further predicted class probability corresponds to a range of tilt values outside of the first range of tilt values.

Clause B4: The method of Clause B3, wherein the range of tilt values outside of the first range of tilt values covers all possible tilt values outside of the first range of tilt values.

Clause B5: The method of any one of Clauses B2 to B4, wherein the classification loss is based only on the tilt value, the set of predicted class probabilities and the at least one further predicted class probability.

Clause B6: The method of any one of Clauses B1 to B5, wherein the classification loss is based only on the tilt value and the set of predicted class probabilities.

Clause B7: The method of any one of Clauses B1 to B5, further including generating the plurality of pairs of images according to the method of any one of Clauses A1 to A8.

Clause B8: The method of any one of Clauses B1 to B7, wherein the plurality of pairs of images comprise or consist of both image pairs and further image pairs generated according to the method of Clause A8.

Clause C1: A computer-implemented method, the method including generating a predicted rotation angle for an image by applying a trained machine learning model running on a computer processing system to the image, wherein the trained machine learning model was trained according to the method of any one of Clauses A1 to A8 or B1 to B8.

Clause C2: The method of Clause C1, further including, by the computer processing system, rotating the image by the predicted rotation angle to generate a rotated image.

Clause D1: A computer-implemented method for receiving data defining an image and determining and returning a predicted rotation value for the image, the method including applying, by a computer processing system, a trained machine learning model to the image, the trained machine learning model determining a class for the image, wherein the class is one of a plurality of classes defined by the machine learning model, wherein each of the plurality of classes is or is associated with a rotation value and wherein the rotation value is a said predicted rotation value for the image.

Clause D2: The method of Clause D1 further including determining, prior to applying the trained machine learning model, that the image is an image to which the trained machine learning model is to be applied, wherein the determining includes applying, by the computer processing system a further trained machine learning model to the image, wherein the further trained machine learning model is a classifier model, trained to determine whether images contain rotation information for determining a said predicted rotation value.

Clause D3: The method of Clause D1 or Clause D2 wherein the machine learning model defines at least one further class, in addition to the plurality of classes, and wherein the method further includes determining by the computer processing system, after applying the trained machine learning model, that the determined class is one of the plurality of classes and not a said further class.

Clause D4: The method of any one of Clauses D1 to D3, wherein the trained machine learning model was trained according to a training process including the method of any one of Clauses A1 to A8 or any one of Clauses B1 to B8.

Clause E1: A computer-implemented method of providing an input to a machine learning model for an image, the method including:

dividing the image into a plurality of images, including at least a first image corresponding to a first part of the image and a second image corresponding to a second part of the image, different to the first part of the image;

forming a first feature vector for the first image and a second feature vector for the second image; and concatenating into a single vector the first feature vector and the second feature vector and providing the single vector as the input to the machine learning model.

Clause E2: The method of Clause E1, wherein dividing the image into a plurality of images divides the image into at least three images formed from respective portions of the image that overlap with at least their adjacent image.

Clause E3: The method of Clause E2, wherein each one of the at least three images is formed from respective portions of the image that overlap with each of the other images of the at least three images.

Clause E4: The method of Clause E2 or Clause E3, wherein dividing the image into a plurality of images divides the image into three images.

Clause E5: The method of any one of Clauses E1 to E4, wherein the providing the single vector as the input to the machine learning model is performed as part of training of the machine learning model.

Clause E6: The method of Clause E5, wherein the image is a rotated version of a target image, the rotated version of the target image being the target image tilted by a known rotation amount and wherein the machine learning model determines a predicted rotation and has as an objective minimisation of an error based on the predicted rotation and the known rotation.

Clause E7: The method of Clause E6, wherein the error is a classification loss.

Clause E8: The method of any one of Clauses E1 to E7, wherein the machine learning model is a trained machine learning model and providing the single vector as the input to the machine learning model part of image processing of the image.

Clause E9: The method of any one of Clauses E1 to E7, further including, prior to the dividing, determining that the image is a rectangular portrait image and wherein dividing the image comprise dividing the rectangular portrait image into two or more square images based on the determination that the image is a rectangular portrait image.

Clause E10: The method of any one of Clauses E1 to E7, further including, prior to the dividing, determining that the image is a rectangular landscape image and wherein dividing the image comprise dividing the rectangular landscape image into two or more square images based on the determination that the image is a rectangular portrait image.

Clause E11: The method of any one of E1 to E10, wherein:

dividing the image into a plurality of images divides the image into N images;

the input is a first input and the method further includes providing a second input to the machine learning model for a further image, different to the first image and the second image, wherein the further image is a square image and the second input is a concatenation of N copies a feature vector for the second image.

Clause E12: The method of any one of Clauses E1 to E11, wherein each said feature vector is formed by a pre-trained convolutional neural network model and wherein the pre-trained convolutional neural network model is different to the machine learning model.

Clause E13: The method of any one of Clauses E1 to E12, wherein the machine learning model is a multilayer perceptron network.

Clause E14: The method of Clause E13, wherein the training of the machine learning model is the method of training of any one of Clauses B1 to B8.

Clause E15: The method of Clause E14, wherein the image processing of the image includes the method of any one of Clauses D1 to D4.

Throughout the specification, unless the context clearly requires otherwise, the terms "first", "second" and "third" are intended are intended to refer to individual instances of an item referred to and are not intended to require any specific ordering, in time or space or otherwise.

It will be understood that the invention disclosed and defined in this specification extends to all alternative combinations of two or more of the individual features mentioned or evident from the text or drawings. All of these different combinations constitute various alternative aspects of the invention.

The invention claimed is:

1. A computer-implemented method including:

determining, via one or more computer processors, that an image requires rotation correction by applying a trained classifier model to the image, wherein the trained classifier model is configured to determine whether the image contains rotation information;

dividing, via one or more computer processors, the image into a plurality of images, including at least a first image corresponding to a first part of the image and a second image corresponding to a second part of the image, different to the first part of the image;

forming, via the one or more computer processors, a first feature vector for the first image and a second feature vector for the second image;

concatenating, via the one or more computer processors, into a single vector the first feature vector and the second feature vector and providing, via the one or more computer processors, the single vector as an input to the machine learning model, wherein the machine learning model is configured to predict a rotation of the image based on the feature vector;

determining, via the one or more computer processors, that a predicted rotation class output by the machine learning model is within a predetermined range of rotation values; and applying, via the one or more computer processors, the predicted rotation to rotate the image based on the determination that the predicted rotation class is within the predetermined range.

2. The method of claim 1, wherein dividing, via the one or more computer processors, the image into a plurality of images divides the image into at least three images formed from respective portions of the image that overlap with at least their adjacent image, and wherein the method includes:

in addition to forming, via the one or more computer processors, the first feature vector and the second feature vector, forming, via the one or more computer processors, a feature vector for each of the other images in the plurality of images;

forming, via the one or more computer processors, the single vector by concatenating the feature vectors formed for each of the plurality of images.

3. The method of claim 2, wherein each one of the at least three images is formed from respective portions of the image that overlap with each of the other images of the at least three images.

4. The method of claim 3, wherein dividing, via the one or more computer processors, the image into a plurality of images divides the image into three images.

5. The method of claim 1 wherein providing, via the one or more computer processors, the single vector as the input to the machine learning model is performed as part of training of the machine learning model.

6. The method of claim 5, wherein the image is a rotated version of a target image, the rotated version of the target image being the target image tilted by a known rotation amount and wherein the machine learning model determines a predicted rotation and has as an objective minimisation of an error based on the predicted rotation and the known rotation.

7. The method of claim 6, wherein the error is a classification loss.

8. The method of claim 5, wherein the training of the machine learning model includes, for each of a plurality of target training images, forming, via the one or more computer processors, at least one rotated image corresponding to that target training image, wherein each of the at least one rotated image is a version of the target training image rotated by a rotation value determined according to a random rotation selection process;

wherein:

the plurality of target training images have a target orientation for the machine learning model;

the image pairs are formed, via the one or more computer processors, by a said target training image and a said rotated image corresponding to that target training image and wherein the method further includes associating, via the one or more computer processors, each image pair with a classification, the classification for an image pair corresponding to that image pair's rotation value or a discretised rotation value for the rotation value.

9. The method of claim 8, further including:

determining, via the one or more computer processors, the plurality of target training images from a plurality of target images according to a random image selection process.

10. The method of claim 1, wherein the machine learning model is a trained machine learning model and providing, via the one or more computer processors, the single vector as the input to the machine learning model is part of a method of image processing of the image to rotate the image.

11. The method of claim 10, wherein the image processing of the image includes applying, via the one or more computer processors, the trained machine learning model to the image, the trained machine learning model determining a class for the image, wherein the class is one of a plurality of classes defined by the machine learning model, wherein each of the plurality of classes is or is associated with a rotation value and wherein the rotation value is a said predicted rotation value for the image.

12. The method of claim 1, further including, prior to the dividing, determining, via the one or more computer processors, that the image is a rectangular portrait image and wherein dividing the image comprises dividing, via the one or more computer processors, the rectangular portrait image into two or more square images based on the determination that the image is a rectangular portrait image.

13. The method of claim 1, further including, prior to the dividing, determining, via the one or more computer processors, that the image is a rectangular landscape image and wherein dividing, via the one or more computer processors, the image comprises dividing the rectangular landscape image into two or more square images based on the determination that the image is a rectangular landscape image.

14. The method of claim 1, wherein:

dividing, via the one or more computer processors, the image into a plurality of images divides the image into N images;

the input to the machine learning model is a first input and the method further includes providing, via the one or more computer processors, a second input to the machine learning model for a further image, wherein the further image is a square image and the second input is a concatenation of N copies of a feature vector for the second image.

15. The method of claim 1, wherein each said feature vector is formed by a pre-trained convolutional neural network model and wherein the pre-trained convolutional neural network model is different to the machine learning model.

16. The method of claim 1, wherein the machine learning model is a multilayer perceptron network.

17. The method of claim 1, wherein the plurality of images are square images and wherein the method includes upscaling or downscaling, via the one or more computer processors, each of the plurality of images to a common size prior to forming the feature vectors.

18. The method of claim 17, wherein the upscaling or downscaling, via the one or more computer processors, is to a common size of x by x pixels, where x is 224, 320 or 480.

19. A computer processing system including one or more computer processors and computer-readable storage, the computer processing system configured to perform a method including:

determining, via one or more computer processors, that an image requires rotation correction by applying a trained classifier model to the image, wherein the trained classifier model is configured to determine whether the image contains rotation information;

dividing, via the one or more computer processors, the image into a plurality of images, including at least a first image corresponding to a first part of the image and a second image corresponding to a second part of the image, different to the first part of the image;

forming, via the one or more computer processors, a first feature vector for the first image and a second feature vector for the second image;

concatenating, via the one or more computer processors, into a single vector the first feature vector and the second feature vector and providing, via the one or more computer processors, the single vector as an input to the machine learning model, wherein the machine learning model is configured to predict a rotation of the image based on the feature vector determining, via the one or more computer processors, that a predicted rotation class output by the machine learning model is within a predetermined range of rotation values; and applying, via the one or more computer processors, the predicted rotation to rotate the image based on the determination that the predicted rotation class is within the predetermined range.

20. Non-transitory computer-readable storage storing instructions for a computer processing system, wherein the instructions, when executed by the computer processing system cause the computer processing system to perform a method including:

determining, via one or more computer processors, that an image requires rotation correction by applying a trained classifier model to the image, wherein the trained classifier model is configured to determine whether the image contains rotation information;

dividing, via one or more computer processors, the image into a plurality of images, including at least a first image corresponding to a first part of the image and a second image corresponding to a second part of the image, different to the first part of the image;

forming, via the one or more computer processors, a first feature vector for the first image and a second feature vector for the second image;

concatenating, via the one or more computer processors, into a single vector the first feature vector and the second feature vector and providing, via the one or more computer processors, the single vector as an input to the machine learning model, wherein the machine learning model is configured to predict a rotation of the image based on the feature vector;

determining, via the one or more computer processors, that a predicted rotation class output by the machine learning model is within a predetermined range of rotation values; and applying, via the one or more computer processors, the predicted rotation to rotate the image based on the determination that the predicted rotation class is within the predetermined range.

\* \* \* \* \*